United States Patent [19]
Hou

[11] Patent Number: 4,596,990
[45] Date of Patent: Jun. 24, 1986

[54] MULTI-JET SINGLE HEAD INK JET PRINTER

[75] Inventor: Shou L. Hou, Radnor, Pa.

[73] Assignee: TMC Company, Wayne, Pa.

[21] Appl. No.: 626,651

[22] Filed: Jul. 2, 1984

Related U.S. Application Data

[63] Continuation-in-part of Ser. No. 343,288, Jan. 27, 1982, abandoned.

[51] Int. Cl.[4] .......... G01D 15/16
[52] U.S. Cl. .......... 346/75; 346/140 R; 400/126
[58] Field of Search .......... 346/75, 140, 1; 400/126

[56] References Cited

U.S. PATENT DOCUMENTS

| | | | |
|---|---|---|---|
| 3,298,030 | 1/1967 | Brown | 346/75 |
| 3,373,437 | 3/1968 | Sweet & Cumming | 346/75 |
| 3,562,757 | 2/1971 | Bischoff | 346/75 X |
| 3,586,907 | 6/1971 | Beam et al. | 346/75 |
| 3,596,275 | 7/1971 | Sweet | 346/75 X |
| 3,689,693 | 9/1972 | Cahill | 346/75 X |
| 3,714,928 | 2/1973 | Taylor | 346/75 UX |
| 3,786,517 | 1/1974 | Krause | 346/75 |
| 3,813,676 | 5/1974 | Wolfe | 346/75 |
| 3,828,354 | 8/1974 | Hilton | 346/75 X |
| 3,836,913 | 9/1974 | Burnett et al. | 346/75 |
| 3,877,036 | 4/1975 | Loeffler | 346/75 |
| 3,900,162 | 8/1975 | Titus | 346/75 X |
| 4,010,477 | 3/1977 | Frey | 346/75 |
| 4,059,183 | 11/1977 | Hoskins | 346/75 X |
| 4,060,804 | 11/1977 | Yamada | 346/75 X |
| 4,069,486 | 1/1978 | Fox | 346/75 |
| 4,074,278 | 2/1978 | Robertson | 346/75 |
| 4,079,824 | 3/1978 | Ku | 400/124 |
| 4,091,390 | 5/1978 | Smith | 346/75 |
| 4,194,210 | 3/1980 | Krause | 346/75 |
| 4,303,925 | 12/1981 | Harbour | 346/75 X |
| 4,346,393 | 8/1982 | Wallace | 346/140 |
| 4,374,387 | 2/1983 | Iyoda | 346/75 |
| 4,401,991 | 8/1983 | Martin | 346/75 |
| 4,429,315 | 1/1984 | Tamai | 346/75 |

OTHER PUBLICATIONS

Pawletko et al.; High Speed Printer, IBM Tech. Disc. Bulletin, vol. 19, No. 9, Feb. 1977, pp. 3355-3356.
Pelkie et al., Ink Jet Head, IBM Tech. Disc. Bulletin, vol. 20, No. 2, Jul. 1977, pp. 553-554.
Fillmore et al., Ink Jet Splatter Reduction with Double Throughput, IBM Tech. Disc. Bulletin, vol. 21, No. 2, Jul. 1978, p. 485.

*Primary Examiner*—Joseph W. Hartary
*Attorney, Agent, or Firm*—Dann, Dorfman, Herrell and Skillman

[57] ABSTRACT

A multi-ink jet printer contains n nozzle orifices, which are aligned in one or two nozzle orifice arrays with its axis (or axes) substantially parallel to the relative print direction. All print droplets generated from nozzle orifices are individually charged and are deflected under a common deflection electric field substantially perpendicular to the relative print direction. All nozzle orifices may be individual single jets, or may be formed on an orifice plate sharing the same ink system, same stimulation, same deflection electrodes and the same ink collector. Using the interlacing schemes described in this teaching, the said multi-ink jet printer can print marks, characters, or graphics on receiving medium at n times the print speed of a single jet printer and still maintaining excellent print quality.

21 Claims, 15 Drawing Figures

MULTI-JET SINGLE HEAD INK JET PRINTER

This is a continuation-in-part application of U.S. patent application Ser. No. 343,288, filed Jan. 27, 1982 now abandoned.

The present invention relates to the use of more than one jet in a single head ink jet printer to accomplish faster and more effective printing, while maintaining an excellent print quality for serial printers. The multi-jet nozzles are aligned in a straight line substantially parallel to the relative printing direction, while droplets from each jet (or nozzle) are deflected under the deflection electric field in a direction substantially perpendicular to the printing direction. An interlacing technique is used to assure quality as good as that of a single continuous jet printer, but it yields a print speed n-times faster, where n is the number of nozzles in the ink jet array printer. The present invention also relates to the method of interlacing to produce that printing.

STATE OF THE ART

At the present time there are available from various sources continuous single jet printer devices. Such a printer has an ink reservoir which is under a constant pressure of typically 16 to 80 pounds per square inch. The pressure causes the ink filament ejected from a small orifice of 20 to 50 microns in diameter toward a small well-defined area of the paper or other receiving medium to be printed which paper is supported a fixed distance from the nozzle on a suitable platen. Under the stimulation of an ultrasonic wave, the filament is broken into a stream of well-defined ink droplets at a rate equal to the frequency of the superimposed ultrasonic wave. Through charge induction, droplets are charged one by one before break-up and the amount of charge causes each droplet to deflect generally perpendicular to the printing direction in proportion to the charge imposed. The droplet is deflected under the influence of an electrostatic field produced by deflection means to a predetermined position. In the course of each of the successive deflections a straight line, generally perpendicular to the print direction (usually a vertical line), or parts of a line, is drawn so that by drawing a series of closely spaced vertically oriented segments of lines the desired character is completed. The charge imposed on the droplets is varied in a predetermined stepwise fashion, but for each droplet there is the option of putting the charge at a level which causes the droplet to be directed to a gutter or ink catcher rather than impinging upon the paper.

Typically, these non-printing droplets are not charged and only the droplets used to draw the successive vertical line segments are charged. Successive vertical lines are drawn as a carriage supporting at least the ink jet orifice and charging electrode moves transverse to the jet deflection, usually horizontally across a line on the paper on the platen for a serial printer. The charge potential for successive droplets is increased or decreased in generally fixed predetermined steps so that if all of the droplets are allowed to impinge the paper, they will together draw a vertical line. Characters are produced by moving the carriage horizontally effectively drawing a successive sequence of vertical line segments at predetermined positions which are needed to form the sequence of selected characters. Particle charge information for each possible character capable of being printed is stored in a memory which typically at each voltage will either allow that deflection voltage to be imposed on the charging electrode or typically in most printers completely removes voltage to allow the ink to be caught in the ink gutter positioned to catch uncharged particles and recirculate them to the reservoir for reuse.

In another configuration, the print head which contains a jet nozzle and deflection plates may be held stationary, while the receiving medium (paper or objects) may be moved by transport means to produce the same mark, character, or graphics as the moving print head printer previously described.

In the prior art, it has been understood that there can be electrostatic interaction between adjacent ink droplets but there is a certain tolerance to error which can be accommodated to the droplet placement. This is preferably less than 30 microns for a resolution of 240 dots per inch (or 10 dots/mm.) and less than 25$\mu$ for 300 dots-/inch printing (or 12 dots/mm.). In the prior art, various techniques were employed for minimizing this error. One of these was the use of guard drops as taught by U.S. Pat. No. 3,562,757, issued February, 1971, to V. Bischoff. Also, there are charge compensation schemes such as illustrated by U.S. Pat. No. 3,828,354, issued Aug. 6, 1974, to H. T. Hilton. However, such known processes have also reduced the number of printing droplets by a factor of 2 to 3 depending, for example, upon the number of non-charged droplets placed between the printing droplets. If every other droplet is not charged, the printing speed is reduced by a factor of 2. If only every other third droplet is potentially capable of charge, printing speed is reduced by a factor of 3.

An ink jet printer of the present invention may be of the type shown in U.S. Pat. No. 3,596,275, issued July 27, 1971, to R. G. Sweet or U.S. Pat. No. 3,298,030, issued January 1967, to A. Lewis and D. Brown. The process has produced 240 dots/inch (or 10 dots/mm.) printing at 92 characters per second at 12 pitch.

There is another approach using ink jet array. Numerous closely packed ink jet nozzles are aligned in a straight line perpendicular to the printing direction. The non-charged droplets are used to print on paper; while the non-printing droplets are charged and deflected into a common gutter and are recirculated into its ink system. The process was first taught in U.S. Pat. No. 3,373,437, issued Mar. 12, 1968, to R. G. Sweet and R. C. Cumming. The process has been further developed at Mead Corporation as taught in U.S. Pat. No. 3,586,907 to D. R. Beam et al, U.S. Pat. No. 3,714,928 to R. P. Taylor, U.S. Pat. No. 3,836,913 to M. Burnett et al, and U.S. Pat. No. 4,010,477 to J. A. Frey.

In this approach, an array with up to 1200 nozzles have been aligned in a 25 cm. head in a direction perpendicular to the print direction. Since each nozzle is a single continuous jet and is printing in a binary mode, a paper roll up to 10½ inches width has been printed after passing under the print head only once at a speed in excess of 1000 feet per minute which is the fastest electronic printer ever built to date.

The approach has all nozzles share a common ink system, a common ink reservoir, a common deflection electrode, and a common ink collector. The cost is substantially less than those of 1200 single continuous jets.

Limited by how closely we can pack nozzles per millimeter and by jet straightness obtained by today's fabrication technology (1 to ½ milliradian), the print quality has not exceeded an equivalent of 240 dots/inch (or 10 dots/mm.).

PRESENT INVENTION

The present invention is directed to a print head containing from 2 to n jets. All jets are aligned in a straight line substantially parallel to the relative printing direction. Each jet deflection is in a direction substantially perpendicular to the print direction. Proper delay is provided to each jet during printing to maintain a good printing quality. By the use of the multiple jets the printing speed will be increased 2 to n times faster depending upon the number of jets used. At 12 characters per inch printing, a high resolution character needs 640 print droplets at 10 dots/mm. (or 240 dots/inch) resolution; and needs 1000 print droplets at 12 dots/mm. (or 300 dots/in.) resolution. While at 5 dots/mm. (or 120 dots-/inch) resolution, only 160 print droplets are sufficient to form a character. A typical continuous ink jet operates at about 100,000 droplets a second. Hence, a typical single continuous jet printer prints about 50 characters per second at 12 dots/mm. resolution; about 80 characters per second at 10 dots/mm. resolution; and about 310 characters per second at 5 dots/mm. resolution. The following table lists the printing speeds as a function of process and a number of jets:

TABLE I

| | | Printing Speed Vs Number of Jets per Head at 132,000 droplets/second | | | |
|---|---|---|---|---|---|
| Number of Jets/Head | | 1 | 2 | 4 | n |
| 12 dots/mm | 2-guard-drop scheme | 44 cps | 88 cps | 176 cps | 44 n cps |
| | 1-guard-drop scheme | 66 cps | 132 cps | 264 cps | 66 n cps |
| 10 dots/mm | 2-guard-drop scheme | 68 cps | 136 cps | 272 cps | 68 n cps |
| | 1-guard-drop scheme | 103 cps | 206 cps | 412 cps | 103 n cps |
| 5 dots/mm | 2-guard-drop scheme | 275 cps | 550 cps | 1100 cps | 275 n cps |
| | 1-guard-drop scheme | 412 cps | 825 cps | 1650 cps | 412 n cps |

At 12 dots/mm., a single continuous jet printer has a quality and speed comparable with that of a daisywheel printer. There is very little price performance advantage over a daisywheel printer. By adding multi-nozzle to the print head, the present invention offers a printing speed increase by n-times (where n is the number of nozzles in a single print head), while maintaining the same high resolution quality. Furthermore, the additional structure required in accordance with the present invention is relatively nominal. The parts are known and easily fabricated and many parts can be used in common such as the ink system, the deflection plates, the gutter and recirculation system. Hence, the process is cost effective.

The following are the descriptions of this invention.

The present invention has the ink jet nozzles aligned in a straight line and is in parallel with the relative print direction. Each nozzle is capable of producing a stream of ink droplets. Each droplet is properly charged to a pre-determined level and is able to be deflected by the deflection electric field to a maximum deflection of at least 1.35 times the character height perpendicular to the print direction. In other words, each nozzle in the ink jet printer prints exactly like the ink jet printer described in the Sweet patent and Lewis and Brown patent. When multi-nozzle print head is used as described, each nozzle will print a portion of the vertical matrices. The vertical matrices printed by different nozzles in the array will interlace to form a high resolution character. Means are provided to produce relative movement between print head and receiving medium substantially parallel to the axis of nozzle alignment.

For example, if the array head contains two nozzles, jet "1" will print every even number of vertical matrices, while the jet "2" will print every odd number of vertical matrices. There is a time delay for jet "2" with respect to jet "1" by $(d\pm 1/R)/10V$ seconds where:

d is the inter jet spacing in mm.,

R is the resolution in dots/mm., and

V is the relative printing speed in cm./sec; or a spacial delay of $(dR\pm 1)$ dotted lines.

It will then be understood that the distance between centers of two nozzles must be a multiple integer of the inter-dot distance between centers for the given resolution.

If three nozzles are used, each nozzle prints only every third vertical matrices, i.e., jet "1" prints $(3m\pm 1)$th dotted line;

jet "2" prints $(3m\pm 2)$th dotted line;

jet "3" prints $(3m\pm 3)$th dotted line;

where m is an integer. The time delays with respect to jet "1" are, $(d\pm 1/R)/10V$ seconds for jet "2"; and $(2d\pm 2/R)/10V$ seconds for jet "3", or there are spacial delays with respect to jet "1" by $(dR\pm 1)$ dotted lines for jet "2", and $(2dR\pm 2)$ dotted lines for jet "3".

In general, if there are n nozzles in a single head separated by a distance d between centers (d is also an integer of 1/R), each nozzle will print every nth dotted line apart. In particular, the Kth jet in the array will print every $(mn\pm K)$th dotted line, while the first jet will print every $(mn\pm 1)$th dotted line, where m is an integer. There exists a time delay for the Kth jet with respect to the first jet by $(K-1)[d\pm 1/R]/10V$ second, or a spacial delay of $(K-1)[dR\pm 1]$ dotted lines.

Let us now examine the electrostatic interaction between charged droplets on flight between two adjacent jets which could effect the droplet placement error. Electrostatic Coulomb force between two charged particles of adjacent jets is $$F = K\frac{q_1 q_2}{r^2}$$

where $q_i$ is the charge contained in the droplet "i", r is the distance between the droplets of adjacent jets, and K is a constant. Note that the closest distance between charged droplets from 2 adjacents jets is the distance between the jet nozzles which as a practical proposition is taken to be 1-3 mm. At 132,000 droplets/sec. and a droplet velocity of 2000 cm./sec., the inter-droplet spacing for a single jet is 0.152 millimeters, the inter-droplet spacing is 7 to 20 times closer than the inter-jet spacing. Since Coulomb force is inversely proportional to the square of the distance, correction due to adjacent jet is very small. Hence, one can ignore both the electrostatic correction as well as the aerodynamic wake effect for droplets between jets.

More specifically, the ink jet printer apparatus of the present invention employs an ink chamber or reservoir having at least two matched orifice nozzles aligned parallel to the relative print direction. Means of constant pressure or of constant flow is employed to apply pressure to the reservoir to force ink out through each of said orifices in a thin filament, including means accoustic energy means generating waves of the same phase being preferred, acting on the ink to break the filament into droplets of predetermined size, each droplet being of a size to produce a dot of predetermined size in a roster of dots forming a printed character. Deflection plates are positioned so that all of the droplets pass in droplet paths from the respective nozzles each in planes, transverse to the deflection plates. Deflection voltage supply means is connected to the deflection plates to impose an electrostatic field between the deflection plates. Charging electrode means is fixed relative to each orifice nozzle in position adjacent to the respective orifice nozzles along the droplet paths from that nozzle. Electrostatic shielding means may be interposed between adjacent charging electrodes to isolate charge effects imposed on droplets of one stream from droplets of another. A source of voltage is connected to the respective charging electrode means. Each charging electrode, in turn, is capable of inducing electrostatic charge on the individual droplets as they break off from the ink filament emerging from the orifice associated with the charging electrode. The droplets are then deflected into paths determined by their respective charges as they pass through the field imposed by the deflection plates. Voltage switching means is provided for applying in a prearranged order selected voltages (which may include zero voltage) to each charging electrode, as the individual droplets pass through. The selected level of voltage induces charge on each droplet to follow a predetermined droplet path to a predetermined position on a receiving medium. Ink collector means is positioned for collection of non-print ink droplets for all nozzles moving along the predictable paths generated by a particular selected level of voltage typically at zero potential. Means is supplied for supporting receiving medium in position such that droplets moving along paths in a plane from an orifice nozzle will impinge the supported receiving medium at points along a line opposite that orifice nozzle and parallel to a line opposite another orifice nozzle upon which droplets from said other nozzle impinge. In one embodiment, carriage is provided for moving together the orifice nozzles and charging electrode means, and usually the deflection means and other ink system related elements relative to the means supporting the receiving medium paper transverse to the plane of droplet paths from a particular nozzle. In other embodiments, the print head containing an array of nozzles aligned in an axis, charging electrodes, and deflection electrodes are held stationary, while the receiving medium is moved in a direction substantially parallel to the axis of nozzle orifices. Thus, it should be understood that the present invention is directed broadly to relative movement between the print head and the receiving medium. Any type of relative movement, consistent with the operation of a print head, between the print head nozzles and receiving media of unlimited variety, is contemplated to be within the scope of the present invention.

The method of the present invention involves either manually or automatically, as by computer, delaying the printing of intermediate lines until the second nozzle orifice catches up with the position adjacent to the first nozzle orifice was in when it printed the line adjacent to which the new line is to be printed by the second nozzle. In accordance with the present invention, the pattern of dots in the $(2n\pm1)$th dotted line printed by the second jet is delayed from the time of the printing of the 2nth dotted line by the first jet by $(d\pm1/R)/10V$ seconds where "d" is in the inter-jet spacing in millimeters, "V" is the relative print speed in cm./sec., and "R" is resolution in dots per millimeter. The spacial delay is expressed $(dR\pm1)$ dotted lines.

DRAWINGS OF THE PRESENT INVENTION

The present invention will be better understood by reference to the accompanying drawings in which.

SPECIFIC EMBODIMENTS OF THE PRESENT INVENTION

Figure 1:
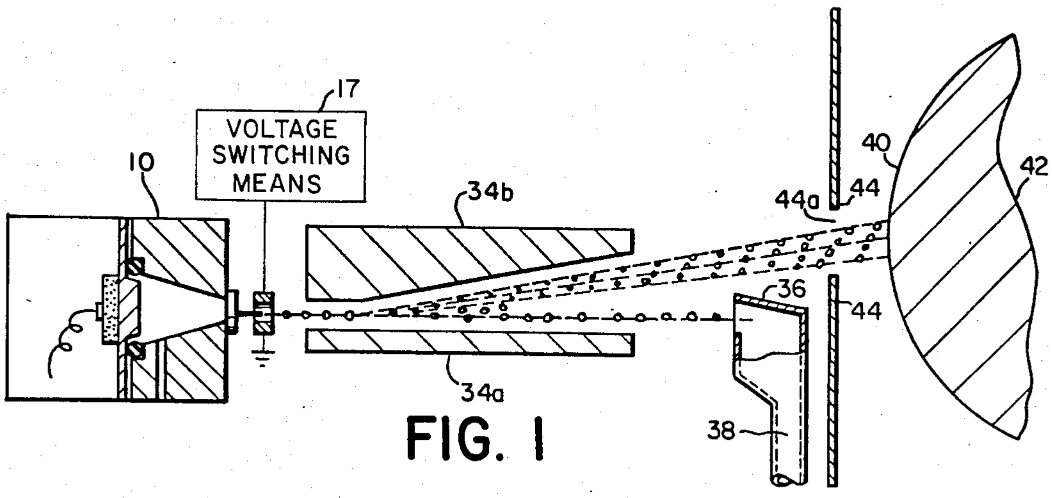
FIG. 1 is a side elevational view of a two jet version of the present invention in a partial sectional view or in the section as taken through the charging electrode ring and deflecting plate along the paths from one orifice.
Figure 2:
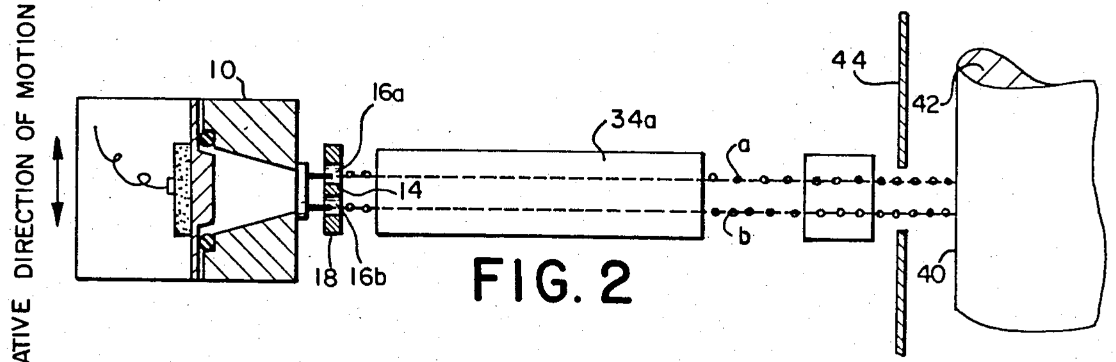
FIG. 2 is a plan view from above partially in section showing a section through the jet path at orifice level at both orifices and the bottom plate of the deflection plates.

Referring now to the drawings, FIGS. 1 and 2, 5, 6, 7 and 8 illustrate a preferred embodiment. Much of the system is known to be conventional. Much of it has been shown in schematic form since the actual physical form is well known. Thus, for example, in FIGS. 1 and 2, the ink chamber 10 is shown schematically. The orifice nozzles through which ink filaments are ejected from the reservoir are best seen as nozzles 12*a* and 12*b* in an orifice plate 12. The use of two nozzles in this configuration is new. A support structure 18 of insulating material supports ring charging electrodes 16*a* and 16*b*, between which is provided a conductive electrostatic shield 14 of conductive material.

Figure 5:
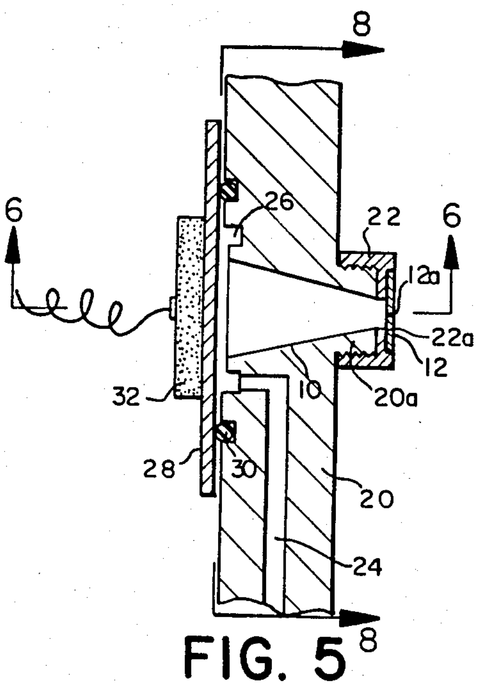
FIG. 5 is a side sectional view of printer head in FIG. 1.
Figure 6:
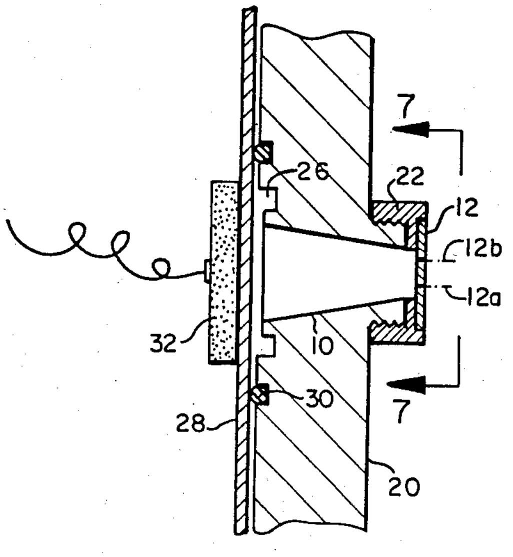
FIG. 6 is sectional view taken along line 6—6 of FIG. 5.
Figure 7:
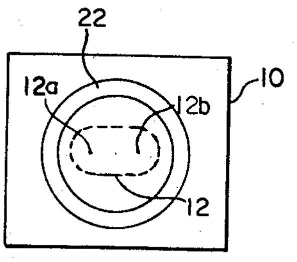
FIG. 7 is a front view of the ink jet head as seen from line 7—7 of FIG. 6.
Figure 8:
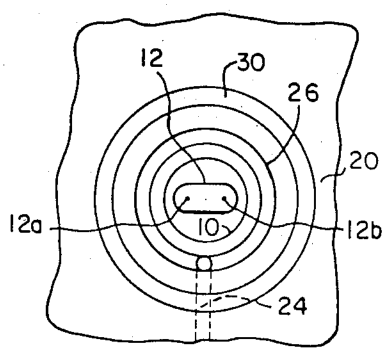
FIG. 8 is a sectional view taken along line 8—8 of FIG. 5.
Figure 10:
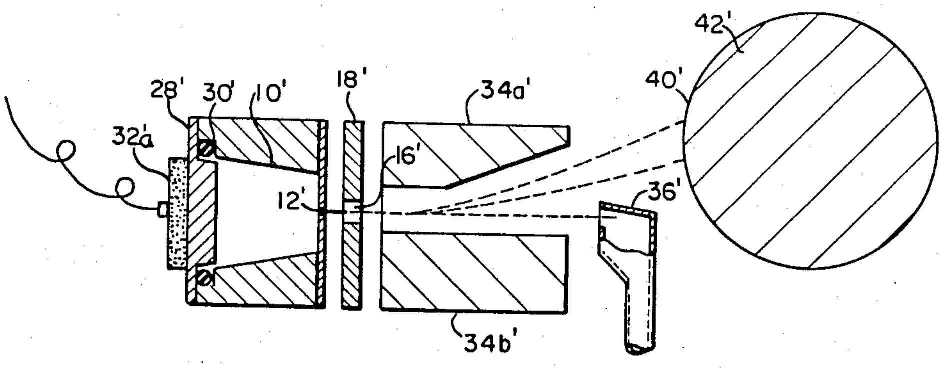
FIG. 10 is a side sectional view across any one of the jets in FIG. 9.

Considering FIGS. 5 and 6 briefly, it will be seen that the reservoir structure is more representative of an actual form which would be employed. The reservoir provides a cone-shaped cavity in a block 20 provided with a cylindrical extension 20*a* the outside surface of which is threaded to engage the threads of a cap 22. The cap closes the narrow end of the conical cavity and is provided with the orifices 12*a* and 12*b* on an orifice plate 12. Ink is fed into the cavity 10 through a conduit 24, preferably from a sump fed from the return means from the gutter (to be described) through a suitable pump which supplies pressure at a constant rate, typically about 16 to 80 pounds per square inch. The ink is fed into the ink chamber by way of a cavity 26 adjacent to back plate 28 mounted on the reservoir plate 20 using a sealing gasket 30 and suitable fasteners and supporting an ultrasonic transducer 32. A filament of ink on the order of 20 to 30 microns in diameter is ejected under the pressure through the orifice nozzle and is broken into well-defined ink droplets in the charge rings 16 at a rate equal to the rate of the frequency of the ultrasonic source, thus, enabling each individual droplet to be separately and differently charged by the charging means 14.

Specifically the two jets involved here are charged by the charging ring electrodes 16*a* and 16*b* which are adjacent to the ink filaments prior to breaking into droplets. The ink droplets are deflected by the electrostatic plates 34*a* and 34*b*. The amount of deflection of an individual droplet depends upon the charge imposed upon that droplet by its charging ring electrode 16*a* or 16*b*. In the usual configuration, uncharged droplets are allowed to proceed undeflected through the electrostatic field between the plates 34*a* and 34*b* into the gutter or catcher 36. They are returned by drain 38 to a sump and by the pump back to the reservoir through the line 24 as described all in conventional manner. If instead of not being charged the droplets are charged, the electrostatic field will act upon them to deflect them. The arrangements shown in the drawings requires an upward deflection. The amount of deflection is usually proportional to the amount of charge induced on the droplet. By varying the amount of charge in steps, a line of dots can be drawn by successive droplets on a piece of paper 40 carried on a platten 42 on a printer. Alternatively, a receiving medium, other than paper, on a support suitable for that medium possibly different from the platen and suitable for the supported receiving medium could be used. The ink must pass through an elongated slot 44*a* in a shield 44 and the slot is gauged to permit the full length of the character to be drawn or printed on the paper 40. In practice, although they are shown as elements broken-away, suggesting their extension the length of the platen, the deflection electrodes 34*a* and 34*b* may be short and carried on the print head carriage or may be made optionally long and extend the length of the printer platen. The same is true of the catcher or gutter 36. The rest of the structure, the charging electrodes 16*a* and 16*b* and their support 18 are effectively mechanically integral with the reservoir and orifices and are part of the print head which, in the illustrated embodiment, may move parallel to the length of the platen. The print head therefore is designed to sequentially print as it moves along the structure, parallel to the platen.

Some dimensions actually used in a two jet construction are helpful in visualizing the size of the structure. The two orifice nozzles located along the horizontal diameter (or axis) are spaced on the order of 3 to 4 mm apart. The tip of the cone in the ink chamber 10— is elongated in the horizontal direction, the direction of head traverse to a dimension of 6 mm as opposed to 3 mm in the vertical dimension. The elongated cone tip is recommended to focus the acoustic energy and to assure an efficient non-perturbed acoustic wave reaching at the orifice nozzles with identical energy density and at identical phase. The back of the cone has a diameter of 8 mm and is closed by a stainless steel plate 28 with a circular disc transducer 32, 8–10 mm in diameter, mounted in the other side of the metal cover for stimulation. For maximum transfer of acoustic energy, the distance between the orifice plate and the back plate for stimulation should be $(2m+1)\ \lambda/4$ where λ is the acoustic wavelength of the ink, and m is an integer. Other than two orifice nozzles at the orifice plate and an elongated cone tip, the head structure remains identical with that of a single jet head structure.

Charging electrodes 16*a* and 16*b* consist of two metal rings with 1.0 mm inner diameter. The thickness of the charging electrode or the length of each ring is about 0.9 to 1.8 mm. The distance between centers of the charging rings is identical to the distance between centers of the orifice nozzles.

Both the orifice nozzles 12*a* and 12*b* and two charging rings 16*a* and 16*b* are located an equal distance above the bottom of the deflection plates 34*a*.

In operation nozzles 12*a* and 12*b* produce jets that are as close to identical twins as possible. As the printer head traverses along its carrier rod (not shown), for example, from left to right, for any given spot on the paper, jet a will reach there first, while jet b is 3 mm. away. The printed dot from a droplet in jet a will be 3 mm. away from the one in jet b, plus additional error caused by the jet straightness. Hence jet straightness is a major concern for a high resolution printing ink jet array. For a printing resolution of 300 dots per inch, the droplet placement error should be within 25 microns. The corresponding jet straightness is less than 1 milliradian.

For a given vertical printed dotted line, there are 40 printing positions vertically for each jet. Signal voltage plus the charge compensation control are used to assure that droplet is placed within a 25 micron radius of the predetermined spot position.

In a regular text printing mode with a resolution of 300 dots per inch (or 12 dots/mm.), jet a will print the 2nth dotted line, while jet b will print the $(2n+1)$th dotted line. There is a delay of $3\times12\pm1$ dotted lines between jets, or a time delay of $(3\pm1/12)/10V$ seconds before jet b starts printing next to the dotted line printed by jet a, where "V" is the relative velocity in cm./second. For bi-directional printing, jet a lags behind jet b by $3\times12\pm1$ dotted lines or lags by a time of $(3\pm1/12)/10V$ seconds.

For a resolution of 240 dots/inch (or 10 dots/mm), each jet prints 32 positions. Jet a prints the even number 2n th dotted lines and jet b prints the odd $(2n-1)$th dotted lines. Time delay between these two jets is $(3\pm1/10)/10V$ seconds or $3\times10\pm1$ dotted lines. In general, if "d" is the inter-jet spacing in mm. and resolution is R dots/mm., then the time delay between two jets is $$(d\pm1/R)/10V \text{ seconds;}$$

or a spacial delay of $$(dR\pm1) \text{ dotted lines.}$$

In a draft printing mode, the electronics takes a slightly different sequence. Jet a will print at the 2(2m) th dotted lines; while jet b prints at the $2(2m\pm1)$ th dotted lines. All odd number of dotted lines are omitted. The time delay between two jets is always $$(d\pm2/R)/10V \text{ seconds;}$$

or a spacial delay of ($dR\pm2$) dotted lines away.

"d", "R" and "V" have been defined previously.

Since each jet is basically the same as a regular single continuous jet used in regular printing, droplet charging, charge compensation, and guard drop scheme are the same. To minimize the cross talk between jets, electrostatic shielding between charging electrodes is recommended.

Figure 9:
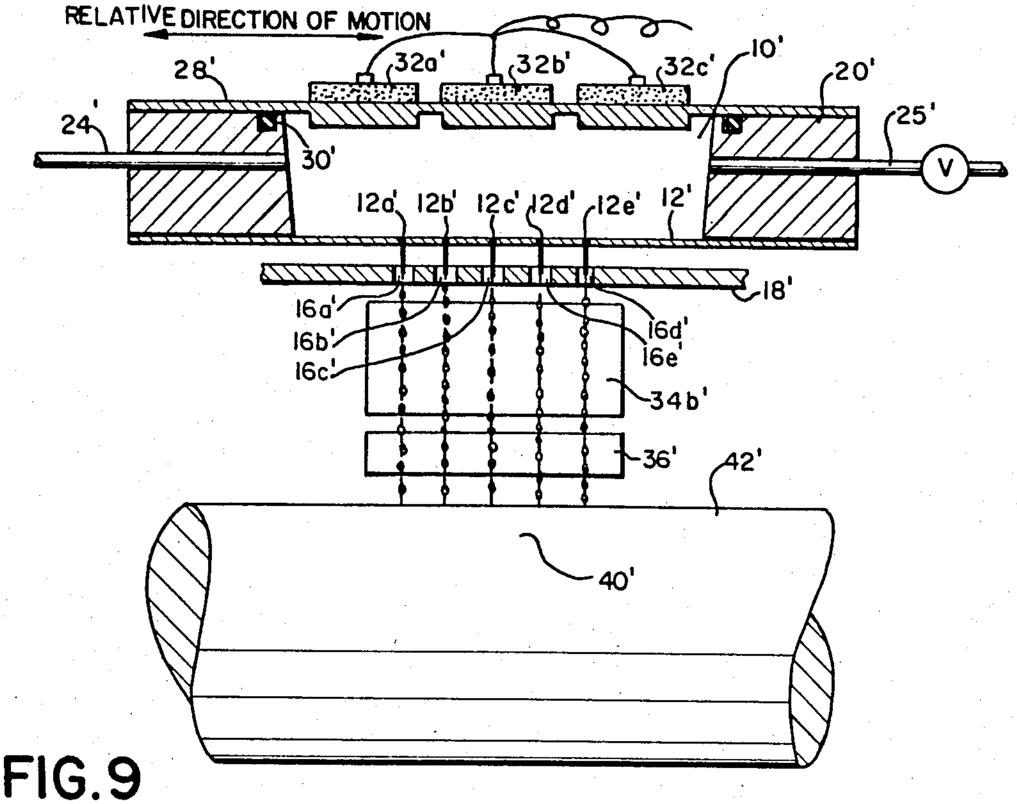
FIG. 9 is a schematic drawing representing a five jet version of the present invention.

Referring now to FIG. 9, a configuration is shown in which a 5-nozzle jet configuration is employed. The structure is very similar to that for the 2-jet array shown in FIGS. 1, 2, 5 through 8 and therefore similar numbers with the addition of primes thereto are employed in the structure. The ink reservoir 10' is modified somewhat in shape and elongated within plate 20' in order to accommodate three transducers 32*a'*, 32*b'*, 32*c'*. The back plate 28' supports the transducers distributed longitudinally and the transducers are interconnected in such a way that they will be cummulative or additive in their effect rather than counteracting the effect of other transducers. Specifically, they all act to generate a pulse which is in phase and they are selected to be of such a frequency as to avoid standing waves or other effects counterproductive to the generation of the droplets. The orifice plate 12' in this case has five separate orifices 12*a'*, 12*b'*, 12*c'*, 12*d'* and 12*e'*. The orifices are carefully aligned substantially parallel to the relative print direction so that they produce jets which are directed in parallel paths. The jets pass through charging rings 16*a'*, 16*b'*, 16*c'*, 16*d'* and 16*e'* and they are each supported on an insulating charge plate 18'. FIG. 9 is a sectional view through the structure so that only the lower deflection plate 34*b'* is seen but it will be understood that an upper deflection plate 34*a'* is also employed as in the prior structure. Furthermore, an ink collector means 36' is positioned so that if no charge is placed upon the droplets, they will be collected by the collection means. However, as in the prior arrangements, if charges are placed upon the droplets, they will be suitably deflected onto paper 40' on a platen 42'.

Figure 11:
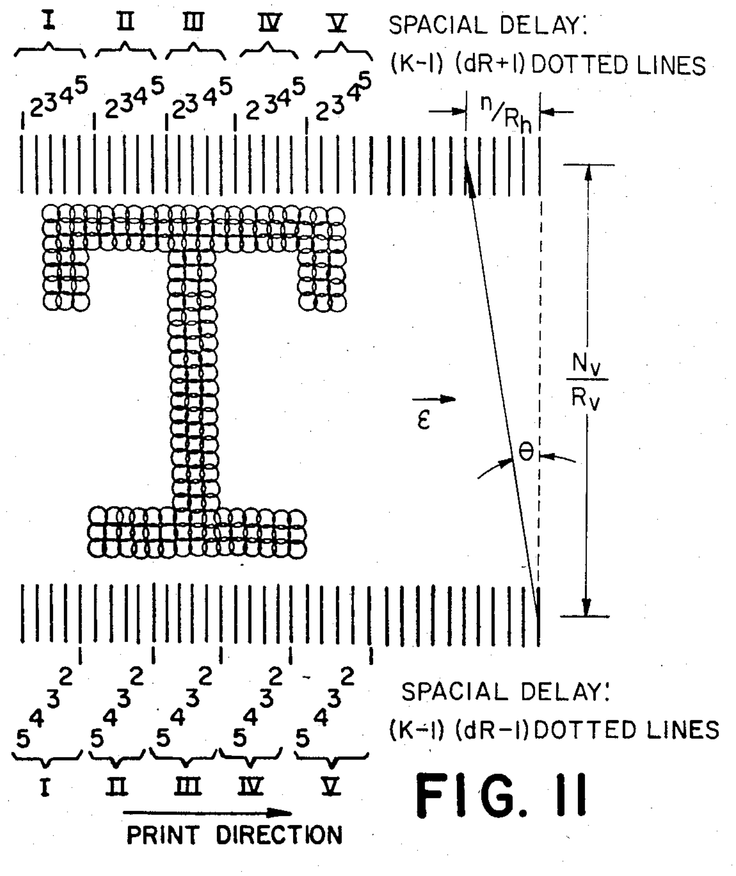
FIG. 11 illustrates how a letter "T" is printed by the five jet printer.

FIG. 11 shows a typical pattern printed by the 5-nozzle printer of FIG. 9 to print a character "T". Jet "1" prints the 1st, 6th, 11th, 16th and 21st dotted lines; jet "2" prints the 2nd, 7th, 12th, 17th and 22nd dotted lines; . . . ; and jet "5" prints the 5th, 10th, 15th, 20th and 25th dotted lines. The interlacing of all printed dotted lines forms the character "T". Note that all 5 nozzles must be identical in every practical means. Jet straightness must be within acceptable level. The interlacing scheme blends all 5 jet printing in every portion of the character. Hence, it produces a more homogeneous appearance, and every slight misalignment will be averaged out. The vertical positional accuracy are precisely taken care of by electronic compensation on the amount of charge given to each individual droplet.

Note that the printing sequence by the 5-jet array is shown on the top of FIG. 11 where kth jet prints every ($5m+K$)th dotted lines, if we choose a time delay for the Kth jet with respect to the 1st jet by $(K-1)(d+1/R)/10V$ seconds, where d, R, m, and V are as defined above. The corresponding spacial delay is $(K-1)(dR+1)$ dotted lines for th Kth jet. Another printing sequence is shown in the bottom of FIG. 11 where the Kth jet prints every ($5m-K$)th dotted lines, if we choose the time delay for the Kth jet with respect to the first jet by $(K-1)(d-1/R)/10V$ seconds. The corresponding spacial delay is $(K-1)(dR-1)$ dotted lines.

Character printing is done through a character generator on a ROM chip. The signal from each dotted column will first go through a specific shift register to provide a proper spacial delay (or time delay) before being sent to the driving electronics for the Kth jet charge electrode.

In FIG. 9 the printer head assembly starts with a transducer array 32*a'*, 32*b'*, 32*c'* of rectangular shape mounted on a back plate 28' opposite to the rectangular pads 31*a'*, 31*b'* and 31*c'*. A transducer array is necessary when the total length of the ink jet array exceeds $\lambda/2$, the half acoustic wavelength of the ink. The acoustic wave generated by the transducer array must have the same amplitude and phase to avoid generating a longitudinal acoustic standing wave along the direction of the orifices. Transducers are mounted by adhesive or mechanical fastner means on the back plate 28', which may be a flat thin plate, or with a number of corresponding pads. The structure separates the transducer array from direct contact with ink, while transmitting acoustic energy effectively to the ink chamber.

The ink chamber contains ink inlet 24' and an ink outlet 25', preferably with a controlled valve (not shown). The tapered slot shape ink chamber block has transducer array mounted on the larger crossection end, and the orifice plate at the tapered end. Mechanical clamping, soldering, or gluing by epoxy are methods of mounting. A tapered shaped ink chamber is to focus the acoustic energy toward the orifice plate. The length of the ink chamber should be at least $\lambda/2$ longer than the total length of the orifice array. The width of the slot in the ink chamber should not exceed half wavelength $\lambda/2$ to avoid higher order standing wave generation. For the best stimulation, the depth of ink chamber between the back plate and the orifice plate should be kept at $(2m+1)\lambda/4$, where m is an integer and $\lambda$ is the acoustic wavelength of the ink at the stimulation frequency.

The fabrication of the orifice plate 12' is one of the most critical parts of the ink jet printer. Although it is possible to drill a series of identical holes on a thin metal plate, (preferably a 5+ to 10 mils stainless or nickel plate) it is better recommended to use photo-fabrication process to control precisely the dimension and the shape. Silicon single crystal wafer can be made as an orifice plate through oxidation then preferentially etch nozzles at predetermined positions using photo-resist. One can also use electroform process to fabricate a precision orifice plate, where a photoresist image is first made on a conductive substrate before electrodeposition. Care must be exercised to assure a perfectly round holes with identical dimensions to minimize the droplet placement error.

Figure 12A:
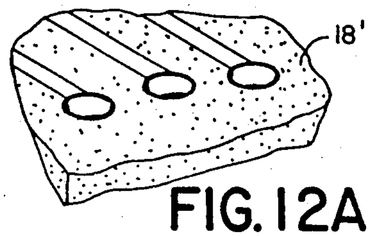
FIGS. 12A, 12B and 12C are fragmentary perspective views of different configurations of changing electrodes.
Figure 12B:
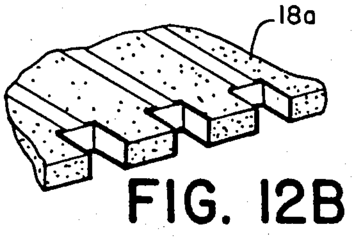
Figure 12C:
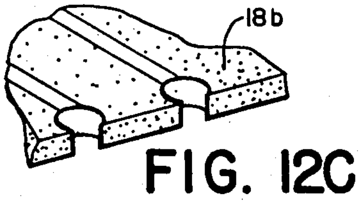

The charge plate 18' has equal number of holes lined-up concentrically with the orifices as shown in FIG. 12A. Conductive rings 16*a'*, 16*b'*, 16*c'*, 16*d'* and 16*e'* are made on the holes in the charge plate and is individually connected to the driving circuit for charging electrode. Electrostatic shields connected to ground, as represented by the ground symbol in FIGS. 1 and 2, between adjacent charge rings are recommended though not necessary. Another configuration of the charge plate consists of an array of conductive U-shaped channels 18*a* (see FIG. 12B) or semi-circles 18*b* (see FIG. 12C) on the charge plate. Each channel is connected to the driving electronic circuit. A conventional voltage switching system 17 is provided for imposing successive levels of potential on the various conductive rings, for example, rings 16*a*′ through 16*e*′, shown in FIG. 9. Although the former configuration has superior shielding against cross-talk between jets, the latter has advantages in operation especially during the start-up and shut down.

The width of the deflection plates and catcher 36′ have to be widened to cover beyond the entire jet array in the present invention. Otherwise, they are identical with that of a single jet printer. The ink chamber, deflection plates, catcher and ink system including pump, filtration, ink supply and tubings are common to all jets.

Figure 3:
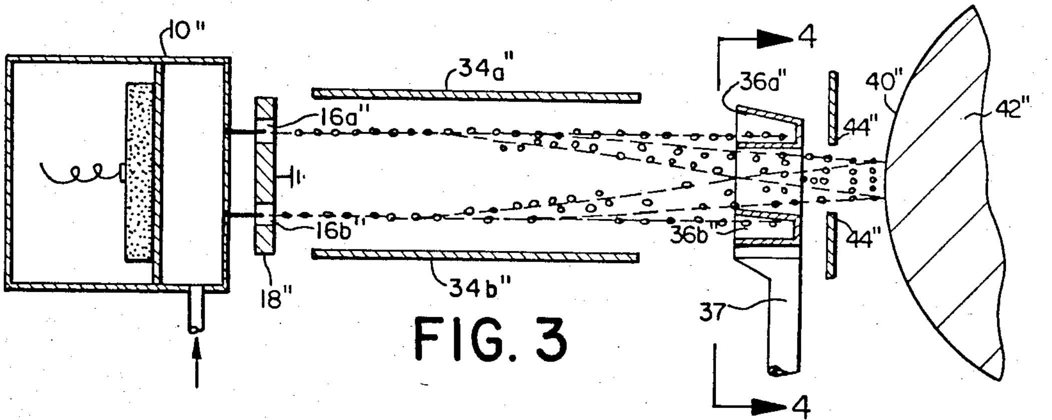
FIG. 3 is an alternative construction shown in a view similar to that of FIG. 1.
Figure 4:
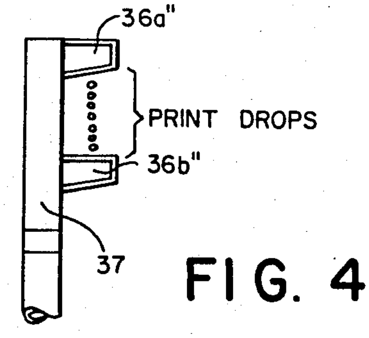
FIG. 4 is a detail view taken along line 4—4 of FIG. 3 showing a modified ink collector means.

Attention is now directed to FIGS. 3 and 4 which shows a modified construction wherein two jets or two rows of nozzle orifices substantially parallel to the relative print direction are employed but the jets are provided one above the print area and the other below the print area instead of in lateral alignment.

FIG. 3 is the side view of another type of 2-jet configuration, where two jets are placed 3 to 6 mm apart one on above and the other below the printing area. The charge electrodes for jet a and jet b have opposite polarities. Under the deflection electric field given in FIG. 3, charged droplets from jet a will be positively "+" charged, hence deflected downward; while droplets from jet b will be negatively charged "−" and are deflected upward. A dual catcher is shown in FIG. 4 which is a sectional view from line 4—4 in FIG. 3. The upper catcher catches the non-print droplets from jet a and the lower catcher catches the non-print droplets from jet b. The aperture between the catcher fingers is the window for printing. It is at least 0.1 inch in height. One may interlace droplets from jet a to droplets from jet b to form a single line (each jet needs only $\frac{1}{2}$ the number of steps per vertical line), or interlace the dotted lines printed by each jet to form a character. In either scheme, the 2-jet head printer will print twice the speed of a single jet printer.

Furthermore, the jet a and jet b in FIG. 3 may be replaced by two rows of ink jet array, each array is substantially parallel to the relative print direction. Row a is located above the print area and row b is located below the print area. The polarities of the matched charge electrodes for row a is opposite to that of row b so that the print droplets from each row of ink jet array are deflected in opposite direction into the print area to form the predetermined characters or images. Using the interlacing schemes described previously, high resolution images can be obtained at a printing speed n times faster than a single jet printer, where n is the total number of jets in the print head.

All the print head structures disclosed thus far have n nozzle orifices aligned in one or two nozzle arrays substantially parallel to the relative print direction. All nozzle orifices share the same ink system which may include an ink chamber, ink reservoir, sump pump, and ink collector. All of them can produce excellent quality at a printing speed n times faster than that of a single jet printer.

Using the same principle, n individual single continuous jets may have their nozzle orifices aligned substantially parallel to the relative print direction. Using identical interlacing schemes, one can also achieve the same high speed and high quality printing.

All print head structures are suitable for uses in a serial printer. It has been a standard practice in printer industry that the print head may move while the receiving medium is held stationary just like a typewriter serial printer where the paper is held stationary during printing. The paper may be advanced in increments after each line of printing is finished.

Figure 13:
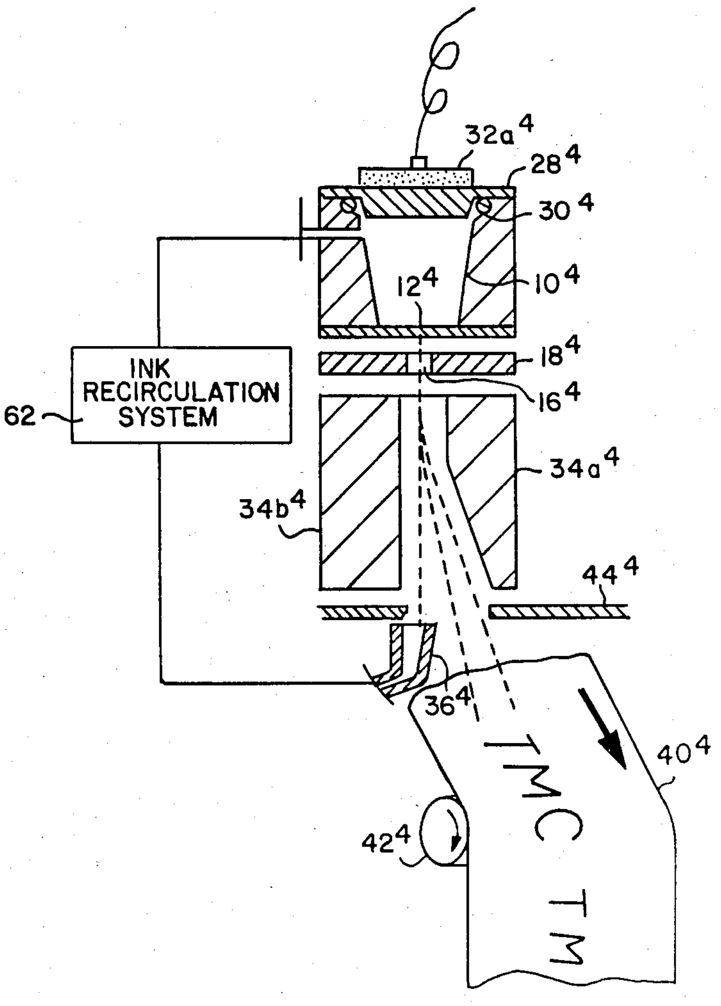
FIG. 13 shows one of the many possible means of moving an ink receiving medium relative to fixed nozzle orifices.

The other standard practice in printers is holding the print head stationary, while means are provided to move the receiving medium as shown in FIG. 13. In this figure, all of the structure shown in the previous figure is repeated and corresponding parts are given corresponding number designators with the addition of an exponent 4. It will be understood correspondingly numbered parts function as their similarly numbered counterparts in earlier figures do. However, in this instance, instead of the paper or other medium receiving the printing or other type of ink coverage standing still, it is moved relative to the stationary ink jet structure. Various forms of movement can take place, but in the represented situation, a continuous web of paper or other ink receiving material 40$^4$ moves in the direction shown by the arrow along a conveying system represented only by the single roller 42$^4$. It will be understood that suitable conventional supply and take up means must be provided and possibly other types of known web handling equipment will be required in an actual installation, in accordance with techniques well known in the art.

The catcher for the ink 36$^4$ feeds a conventional ink recirculation means 62 which returns ink to ink reservoir 10$^4$.

In either case, the direction of nozzle orifices array and the relative print direction are substantially in parallel as required in this teaching. The nozzle orifices do not physically cover the entire printing area in constrast with prior arts on various multi-jet printers, which covers the entire printing area like U.S. Pat. No. 3,373,437 issued to R. Sweet and R. Cumming and U.S. Pat. No. 4,364,060, issued to K. Jinnai, et al. where jets are operated in binary mode; and like U.S. Pat. No. 4,091,390 issued to N. C. Smith and J. T. Wilson and U.S. Pat. No. 3,786,517 issued to K. A. Krause where multiple jets, inclined or perpendicular to the relative print direction, physically cover the entire printing area and each jet by deflection prints a band of area between one of its nearest neighbor jets.

Printers may be operated to precisely control the positions where each dotted line is printed before moving to the next print position for the second dotted line. Usually printers are operated in a constant relative velocity mode. To print a vertical straight line and to utilize every print droplet, a printer with n nozzle orifices must have its deflection electric field tilted by an angle $\theta$. This, in practice, usually means tilting electrodes 34*a* and 34*b* of FIG. 1 and 34*a*′ and 34*b*′ of FIG. 9, for example, about an axis parallel to the plane of the drawings of these electrodes in both FIGS. 1 and 2 to a position $\theta°$ displaced from the position shown, in order to correspondingly tilt the field. The following relationships must be observed:

$$\tan\theta = \pm\frac{n R_v}{N_v R_h}$$

and the relative print velocity $$V = \frac{nN}{10 N_v R_h}\ \text{cm/sec,}$$

where $\theta$ is the angle between the direction of deflection electric field and the normal of relative print direction, n is the total number of nozzle orifices in the print head, N is the total number of available print droplets generated per second per jet, $N_v$ is the number of vertical print positions available per nozzle orifice, and $R_h$, $R_v$ are horizontal and vertical resolutions in dots/mm., respectively. The "+" and "−" signs depend on the direction of relative movement and the sequence of droplet printing either from top to bottom or visa versa. The relationship can also be visualized from FIG. 11, the diagram which schematically illustrates the range of distribution of ink droplets by the electrostatic field in a line along a relatively moving receiving surface at a constant speed. In order to print the lines normal to the direction of movement and the physical alignment of the orifice nozzles, the field must be tilted; otherwise, the lines will be tilted at an angle-$\theta$ to normal which is determined by relative speed of movement. Correction is accomplished by tilting the deflection field by the angle $\theta$. When the printer is operating in a constant velocity mode, such correction will allow the line to be normal to the direction of movement. In a five jet printer, as shown in FIGS. 9 and 11, the resolution is 240 dots per inch both in the vertical and horizontal directions. Hence, $n/R_h=5$, $N_v/R_v=32$ and $\tan\theta=\pm0.15625$ or $\theta=\pm8.88°$.

The invention as described above suggests only a few of its possible embodiments. While some variations and modifications have been described, it will be clear to those skilled in the art that many more exist. All variations, modifications and embodiments of the invention with the scope of the claims are intended to be within the scope and spirit of the present invention.

I claim:

1. A multi-ink jet printer providing interlacing of print lines to provide a band of printing across a receiving medium comprising:

an ink chamber and an array of nozzle orifices generally aligned on an axis substantially parallel to the relative print direction, means to apply pressure to the ink chamber to force ink out through each of said nozzle orifices in a thin filament, including means acting on the ink to break the filament into droplets of predetermined size, each droplet producing a dot of predetermined size in a raster of dots forming a printed character, deflection plates between which all of the droplets pass in droplet paths from the respective nozzle orifices each in paths transverse to an electrostatic field created by the deflection plates, deflection voltage supply means connected to the deflection plates to impose an electrostatic field between the deflection plates, charging electrode means fixed relative to each nozzle orifice in position adjacent to the breaking point of ink filament associated with the respective nozzle orifices along the droplet paths from that nozzle, a source of voltage connected to the respective charging electrodes means each of which in turn is capable of inducing electrostatic charge on the individual droplets as they break off from the filament emerged from the nozzle orifice associated with the charging electrode, causing the droplets to be deflected into paths determined by their charge as they pass through the field imposed by the deflection plates, such that the range of possible deflection is sufficient to permit the printing of one line of a predetermined width on receiving medium in one sweep across the printing band, voltage switching means applying selected voltage in a prearranged order to each charging electrode as individual droplets break off from the ink filament adjacent the charging electrode to induce a charge of predetermined magnitude on each droplet causing each droplet to follow a particular path to a predetermined position within each line on the receiving medium, ink collector means positioned for collection of non-print ink droplets for all jets generated by a particular level of voltage, and means for supporting the receiving medium and said array of nozzle orifices for relative movement in a direction substantially parallel to said axis of said array of nozzle orifices so that by relative movement a band is covered on the receiving medium in which all print positions within the band are able to be filled by lines each drawn by a single nozzle orifice such that the lines drawn by all of the nozzle orifices are interlaced within the band.

2. The multi-ink jet printer of claim 1 in which the nozzle orifices and related structure are stationary and the means supporting the receiving medium is movable relative thereto.

3. The multi-ink jet printer of claim 1 in which the nozzle orifices and related structure are on a carriage movable relative to the means supporting the receiving medium, and means for advancing the receiving medium in increments of predetermined width.

4. The ink jet printer of claim 1 in which the ink collector means is connected by recirculation means back to the ink chamber.

5. The ink jet printer of claim 1 in which electrostatic means is interposed between adjacent charging electrodes to isolate charge effects imposed on droplets of one stream from droplets of another.

6. The ink jet printer of claim 1 in which the means to apply pressure to the reservoir to force ink out through the orifices is constant pressure or constant flow means and the means acting on the ink to break the filaments into droplets is an acoustic wave generator positioned relative to the ink chamber and nozzle orifices to generate acoustic waves of the same amplitude and the same phase.

7. The ink jet printer of claim 1 in which the means to apply pressure to the reservoir includes means for recirculating ink from the ink collector means and applying constant pressure or constant flow characteristics to the ink and the means acting on the ink to break the filament into droplets includes a plurality of acoustic wave generating means positioned relative to the ink chamber and the nozzle orifices such that acoustic waves generated are of the same amplitude and the same phase.

8. The ink jet printer of claim 1 in which a plurality of charge rings are molded in a single insulating block and conductive members are placed between the charge electrodes and are grounded electrically to afford electrostatic shielding to isolate charge effects imposed on droplets of one stream of droplets of another.

9. The ink jet printer of claim 1 in which the charging electrode means are supported in common insulating structure.

10. The ink jet printer of claim 9 in which the charging electrode means are each ring-shaped, U-shaped, or semicircular shaped, and each charging electrode is precision-formed to be identical to one another.

11. A multi-ink jet printer providing interlacing of dotted lines in a matrix print format for marking a receiving medium comprising:

an array of nozzle orifices aligned along an axis and connected to an ink source, means to apply pressure to the ink source to force ink out through each of said nozzle orifices in a thin filament, including means acting on the ink to break the filament into droplets of predetermined size, droplets issuing from a respective one of said nozzle orifices capable of producing one of the dotted columns in the matrix print format, means for establishing an electrostatic field having a direction substantially perpendicular to said axis of said array of nozzle orifices through which all of said droplets pass, each droplet path being transverse to the direction of the electrostatic field, charging electrode means positioned adjacent to each nozzle orifice for individually charging said droplets, a signal source connected to said charging electrode for selectively inducing electrostatic charges on said individual droplets as they break off, causing them to be deflected into paths determined by their charge level as they pass through said electrostatic field, such that the range of possible deflection is sufficient to permit the printing of a matrix print format of a predetermined height on the receiving medium, switching means for switching said signal source in a prearranged order to apply a selected voltage to each charging electrode means as individual droplets break off to induce a charge of predetermined magnitude on each droplet to cause each droplet to be directed to a predetermined position on the receiving medium whereby each dotted line of the matrix print format is marked by droplets issuing from one of said nozzle orifices only and the respective dotted lines are interlaced until each matrix print format is completed, and means for supporting the receiving medium and said array of nozzle orifices for relative movement in a direction substantially parallel to said axis of said array of nozzle orifices.

12. An ink jet printer in a serial printer configuration in which nozzle orifices are aligned substantially parallel to the relative print direction and in the same plane along which relative movement occurs between the receiving medium and the nozzle orifice array including droplet charging means and deflection means, the path of droplets produced from different nozzle orifices at any given time lying in parallel planes transverse to deflection plates, such that the droplets from one nozzle orfice impinging receiving medium supported in their paths in one pass cover all printing positions in the line and, as required, form lines of predetermined width parallel to and interlaced with lines formed by droplets from the other nozzle orifices confined to the same band, the width of which is determined by the deflection of ink droplets, there being sufficient nozzle orifices to cover all lines including all print positions in the band.

13. The ink jet printer of claim 12 in which the spacing of the nozzle orifices and the timing of the relative motion are such that lines drawn by droplets from the respective orifices are interlaced with one another.

14. An ink jet printer for printing along a band onto a relatively moving receiving medium comprising:

an ink chamber having at least two matched orifice nozzles so that one orifice is positioned beyond one edge of the band of printing and the other orifice is positioned beyond the other edge of the band, means to apply pressure to the ink chamber to force ink out through each of said orifice nozzles in a thin filament, including means acting on the ink to break the filament into droplets of predetermined size, each droplet capable of producing a dot of predetermined size in a raster of dots forming the printing within the band, deflection plates between which all of the droplets pass in droplet paths from the respective orifice nozzles each in paths transverse to the deflection plates, deflection voltage supply means connected to the deflection plates to impose and electrostatic field between the deflection plates, charging electrode means fixed relative to each orifice nozzle in position adjacent to the respe ti e orifice nozzles along the droplet paths from that nozzle, a source of voltage connected to the respective charging electrode means each of which in turn is capable of inducing electrostatic charge on the individual droplets as each droplet breaks off from the filament emerged from the orifice nozzle associated with the charging electrode, causing the droplets to be deflected into various positions within a plane transverse to the deflection plates to place dots in a straight line on the receiving medium or omit them as determined by their charge as they pass through the field imposed by the deflection plates, imposing positive charges of predetermined magnitude upon the stream of droplets from one nozzle orifice and negative charges upon the droplets from the other nozzle orifice so that the droplets are deflected in opposite directions, and print lines produced by each orifice nozzle are interlaced to form separate lines defining a desired mark, or a character, and means for supporting the receiving medium and the at least two matched orifice nozzles for relative movement substantially parallel to the relative print direction.

15. The ink jet printer of claim 14 in which separate ink collector means positioned above and below respective orifices are employed to collect the non-print ink droplets from the respective orifices.

16. The ink jet printer of claim 14 in which said orifice nozzles are in two rows of ink jet nozzle orifice arrays located above and below the print area, each array of nozzle orifices aligned in an axis substantially parallel to each other, the signals for the charging electrodes having opposite polarities between the two rows of orifice nozzles so that print droplets from said two rows of orifice nozzles are deflected in opposite direction into the print area and are interlaced to form a predetermined character or image, and means for supporting the receiving medium and said arrays of nozzle orifices for relative movement in a direction substantially parallel to the axis of said arrays of nozzle orifices.

17. The method of printing with a multi-ink jet printer to accomplish proper line interlace within a given character where the printer has an array of nozzles parallel to the relative print direction, means for generating sequentially timed droplets from the nozzles, individual means for each nozzle for omitting or imposing different charges upon the droplets in accordance with instructions from a memory and means for deflecting droplets on which a charge has been imposed to permit drawing a complete line including every selected print location in that line comprising:

generating droplets from each of the adjacent nozzles, charging each droplet in accordance with selected character patterns of characters selected from memory, imposing a uniform field for the array to deflect charged droplets to draw parallel lines or partial lines needed for selected characters transverse to the direction of relative movement to provide a band of printing, such that the kth jet of an n jet array will print every (mn±k)th line where m is an integer, and timing delay between the droplet line patterns for adjacent nozzles to (D±1/R)10V seconds where R is the resolution defined in dots per millimeter and D is the spacing in millimeters between adjacent nozzles and "V" is the relative print speed in cm./sec. so that interlaced lines properly complete the selected characters.

18. The method of printing with a multi-ink jet printer having an array of nozzles parallel to the relative print direction, means for generating sequentially timed droplets from the nozzles, individual means for each nozzle for omitting or imposing different charges upon the droplets in accordance with instructions from a memory and means for deflecting droplets on which a charge has been imposed to permit drawing a complete line including every selected print position in that line comprising:

generating droplets from each of the adjacent nozzles, charging each droplet in accordance with selected character patterns of characters selected from memory, imposing a uniform field for the array to deflect charged droplets to draw parallel lines or partial lines needed for selected characters transverse to the direction of relative movement to provide a band of printing, such that the kth jet of an n jet array will print every (mn±k)th line where m is an integer, and subjecting droplets generated from a lagging adjacent jet to form adjacent interlaced lines in a character to a spacial delay of (DR±1) dotted lines wherein D is the spacing between centers of adjacent nozzles in millimeters and R is resolution in dots per millimeter, and repeating the process along each line of characters.

19. A method of ink jet printing using two jet heads aligned parallel to the relative print direction comprising generating droplets by a jet orifice structure, placing programmed charges on successive droplets and deflecting the droplets onto a receiving medium to print an nth line in a character, employing a second jet to print the (n±1)th line, by the same process, after a timed delay of (D±1/R)/10V seconds or a spacial delay of (RD±1) dotted lines, where resolution is R dots per millimeter, D represents spacing between centers of adjacent nozzles in millimeters, and V is the relative printing velocity in cm/sec.

20. A method of ink jet printing using two jet heads aligned substantially parallel to the relative print direction comprising generating droplets by a jet orifice structure, placing programmed charges on successive droplets and deflecting the droplets onto a receiving medium to print at the 2(2n)th line in a character, employing a second jet to print the 2(2n±1)th line, by the same process, after a timed delay of (D±2/R)/10V seconds or a spacial delay of (DR±2) dotted lines, where resolutions is R dots per millimeter, D represents spacing between centers of adjacent nozzles in millimeters, and V is the relative print velocity in cm/sec.

21. A multi-ink jet printer of claims 1, 11, 12, 14, or 16 containing n nozzles orifices aligned in one or two arrays with axis (or axes) substantially parallel to the relative print direction, printing in a constant relative print velocity mode, the deflection electric field must be tilted by an angle $\theta$, statisfying the following relationships:

$$\operatorname{Tan}\theta = \pm\frac{n R_v}{N_v R_h},$$

and the relative print velocity $$V = \frac{nN}{10 N_v R_h}\ \text{cm/sec},$$

where $\theta$ is the angle between the direction of deflection electric field and the normal of relative print direction, n is the number of nozzle orifices in the print head, N is the total number of possible print droplets generated per orifice per second, $N_v$ is the number of possible print positions available in the vertical direction, and $R_v$ and $R_h$ are resolutions in dots/mm. in the vertical and horizontal directions, respectively.

* * * * *

UNITED STATES PATENT AND TRADEMARK OFFICE
CERTIFICATE OF CORRECTION

PATENT NO. : 4,596,990

DATED : June 24, 1986

INVENTOR(S) : Shou L. Hou

It is certified that error appears in the above—identified patent and that said Letters Patent is hereby corrected as shown below:

Column 8, line 38, delete "(2n + 1)th" and insert --(2n $\pm$ 1)th--;

Column 9, line 64, delete "th" and insert --the--;

Column 12, line 33, delete "constrast" and insert --contrast--;

Claim 14, column 16, line 19, delete "and" and insert --an--;

Claim 14, column 16, line 22, delete "respe ti e" and insert --respective--;

Claim 21, column 18, line 29, delete "nozzles" and insert --nozzle--.

Signed and Sealed this

Twenty-fourth Day of March, 1987

*Attest:*

DONALD J. QUIGG

*Attesting Officer* *Commissioner of Patents and Trademarks*